United States Patent [19]

Heinemann

[11] Patent Number: 4,838,830
[45] Date of Patent: Jun. 13, 1989

[54] FLEXIBLE COUPLING

[75] Inventor: Otto F. Heinemann, Ennigerloh, Fed. Rep. of Germany

[73] Assignee: Renk Tacke GmbH, Fed. Rep. of Germany

[21] Appl. No.: 171,374

[22] Filed: Mar. 21, 1988

[30] Foreign Application Priority Data

Mar. 20, 1987 [DE] Fed. Rep. of Germany ....... 3709132

[51] Int. Cl.$^4$ .......................... F16D 3/02; F16D 3/56
[52] U.S. Cl. ...................... 464/69; 464/102; 464/147
[58] Field of Search ............... 464/69, 81, 102, 106, 464/147

[56] References Cited

U.S. PATENT DOCUMENTS 3,132,479  5/1964  Kuhn, Jr. ................... 464/147 X
3,411,324  11/1968  Federline ........................ 464/69
4,705,489  11/1987  Haarmann et al. ............. 464/102 X

FOREIGN PATENT DOCUMENTS 512921  11/1930  Fed. Rep. of Germany ...... 464/147
2221976  10/1974  France ................................ 464/69

Primary Examiner—Daniel P. Stodola
Attorney, Agent, or Firm—Larson and Taylor

[57] ABSTRACT

A flexible coupling in which two collars are connected with each other through two pairs of coupling rods which are offset from each other angularly by 90°, the two pairs lying in parallel planes. The coupling rods are connected through torsion layers to coupling arms which are articulated to each other. One of the coupling rods or coupling arms are connected to their respective collars while the other of the coupling rods or coupling arms are connected to an intermediate member located between the two collars.

6 Claims, 4 Drawing Sheets

FLEXIBLE COUPLING

FIELD OF THE INVENTION

This invention relates to couplings for transmitting torque from one shaft to another, and in particular it relates to a flexible coupling.

BACKGROUND OF THE INVENTION

Couplings are traditionally divided into two types, rigid couplings and flexible couplings With rigid couplings the torque transmission occurs directly without any possibility of flexing or the like. Flexible couplings on the other hand are constructed to compensate for certain wavelength prolongations and irregularities of the torque. Articulated joint couplings which receive longitudinal movements, parallel movements and angular deviations of the shafts are in this category of flexible couplings. This category also includes torsion spring couplings which can compensate for rotary oscillations or torsional vibrations and torque thrusts.

SUMMARY OF THE INVENTION

The object of the present invention is to provide a flexible coupling which is characterized by a simple construction which is relatively small in size (especially shorter in length) and which permits a large axial offset, a large radial offset as well as a large angular offset (of greater than 10°) as between the two shafts. With such an arrangement, the rotational stability of the coupling according to the invention can be adjusted as desired within a wide range in the construction (between high torque resistance and high rotational elasticity). Another object of the invention is to manufacture the flexible coupling as an all-steel coupling with as high as desired rotational elasticity.

BRIEF DESCRIPTION OF THE DRAWINGS

There follows a detailed description of two embodiments of the present invention which are described with reference to the accompanying drawings, wherein.

DETAILED DESCRIPTION OF THE PREFERRED EMBODIMENTS

Figure 1:
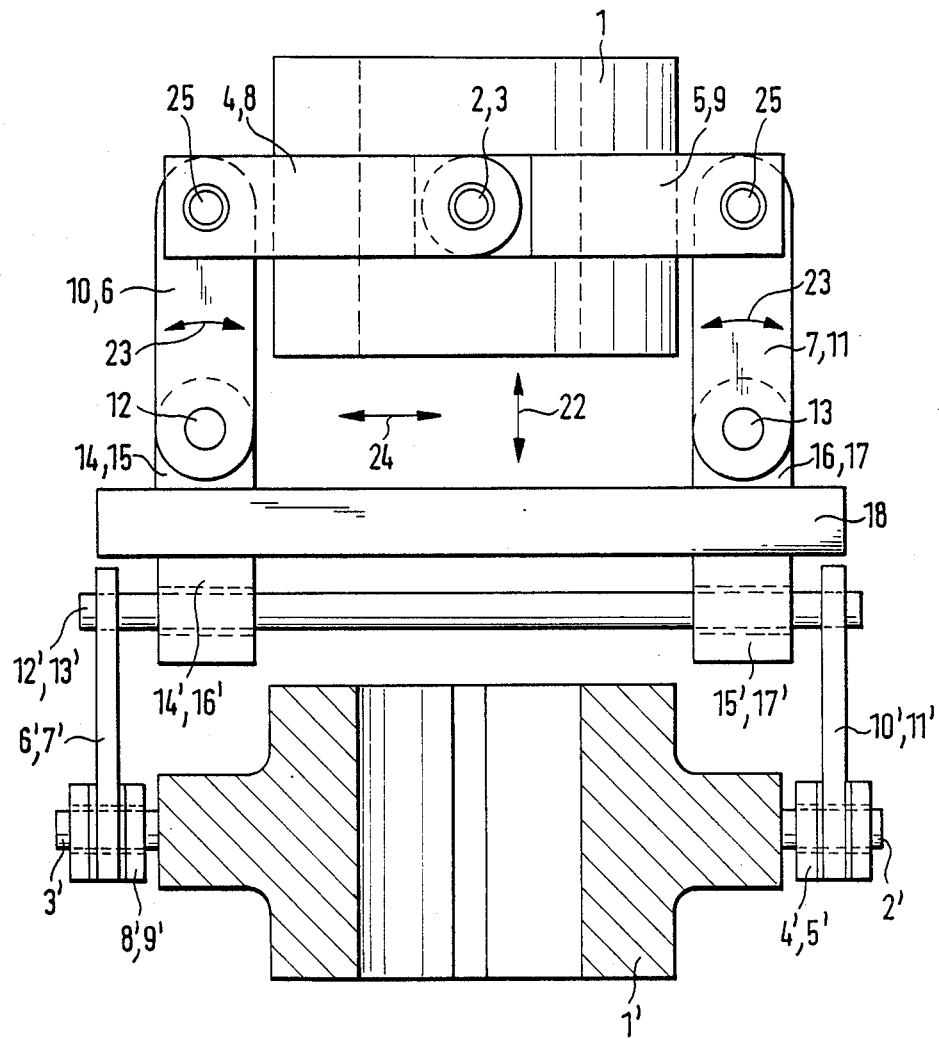
FIG. 1 is a side view, with the lower portion shown in central section, of a first embodiment of the invention.
Figure 2:
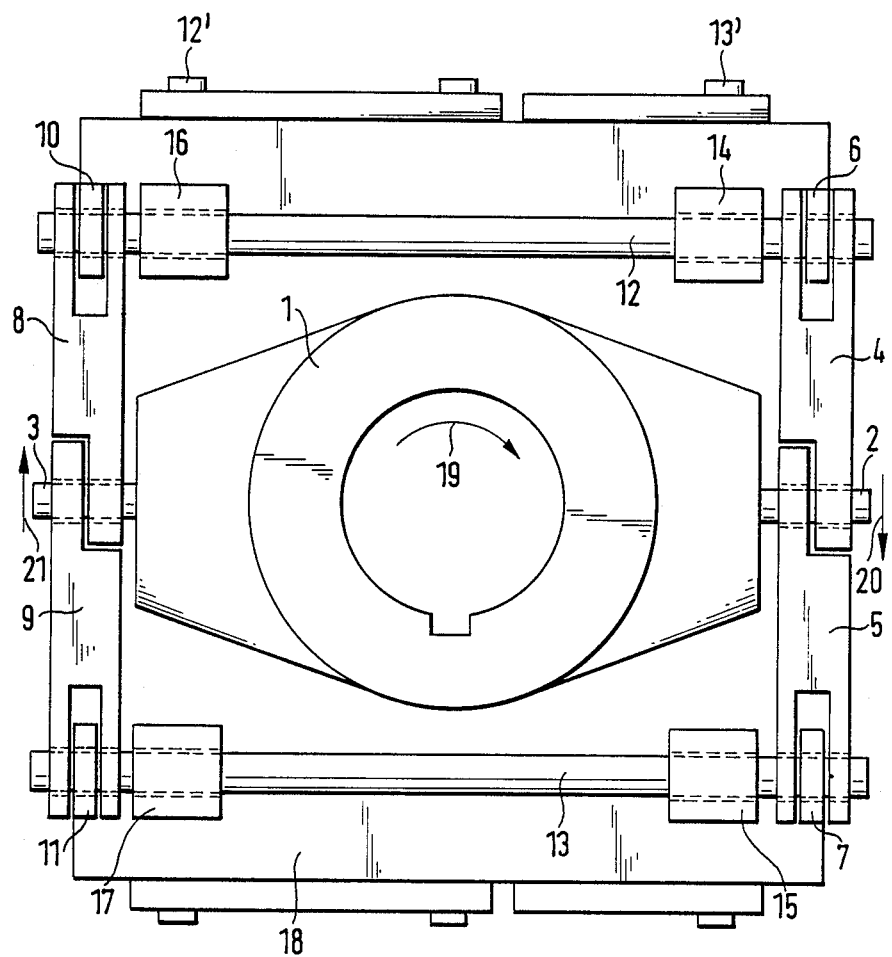
FIG. 2 is a plan view of FIG. 1 which is turned 90° relative to the orientation of FIG. 1.

The flexible coupling shown in FIGS. 1 and 2 includes a pair of collars 1, 1', each of which has a pair of support axles 2, 3 or 2', 3', respectively. A pair of coupling arms 4, 5 are articulated on support axle 2, which coupling arms are also articulated at their outer ends with a pair of torque levers 6, 7, respectively.

In a corresponding manner, two coupling arms 8, 9 are mounted on support axle 3 and are articulated at their other ends with torque levers 10, 11.

Torque levers 6 and 10 are non-rotatably fastened to the two ends of a coupling rod 12. In a corresponding manner, the torque levers 7 and 11 are non-rotatably connected to the ends of a coupling rod 13.

The two coupling rods 12 and 13 are configured as torsion spring rods and are mounted rotatably in bearings 14, 15 or respectively 16, 17.

The aforementioned bearings 14 to 17 are arranged on the one side of an intermediate member 18 which is configured as a rectangular or quadratic plate or respectively are formed as one integral piece with this intermediate member.

The connection between the collar 1' and the intermediate member 18 corresponds to the above described connection between the collar 1 and the intermediate member 18, and accordingly corresponding numerals have been used except that each numeral is changed by a prime mark (').

FIG. 2 more clearly illustrates that the coupling rods 12 and 13 associated with the collar 1 are arranged off center, i.e., spaced away from the axis of the collar 1 and symmetrical relative to the axis of the collar 1. In a corresponding manner, this is also true for the coupling rods 12' and 13' which are associated with the collar 1'.

The two pairs of coupling rods 12, 13 and 12', 13' are angularly offset relative to each other by 90°, each pair of coupling rods lying in a plane relative to the plane of the other pair, and located on different sides of the intermediate member 18.

The coupling of FIGS. 1 and 2 operates as follows.

The torque to be conveyed is split into tangential or circumferential forces which are transmitted from the coupling arms 4, 5, 8, 9, as traction and compression forces. If for example the effective torque is transmitted from collar 1 in the direction of arrow 19, then coupling arms 4 and 5 are moved in . the direction of arrow 20 and coupling arms 8 and 9 in the direction of arrow 21. Over the torque levers 6 and 10 or respectively 7 and 11, the coupling rods 12 and 13 are also loaded with torque. The two other coupling rods 12, 13, function in the same way. The desired rotational elasticity of the coupling is attained as a result of the torsional stresses on the two pair of coupling rods.

If an axial thrust of collar 1 occurs relative to collar 1' (for example, in the direction of arrow 22), then torque levers 6, 7, 10 and 11 are drawn somewhat inward over coupling arms 4, 5, 8, 9 (in the direction of arrow 23). Coupling rods 12, 13 are then rotated slightly in the opposite direction in their bearings 14, 15 or 16, 17, respectively. In this manner a considerable axial movement of the two collars 1, 1' relative to each other is possible.

If collar 1 is moved radially (for instance in the direction of arrow 24) relative to collar 1', then coupling rods 12, 13 are rotated (over coupling arms 4, 5, 8, 9 and torque levers 6, 7, 10 and 11) in the same direction in their bearings.

It is apparent that as a result of the arrangement of the two pairs of coupling rods 12, 13, 12', 13', offset 90° from each other, radial movements of the two collars 1, 1' can be made in the desired directions.

An observation of FIGS. 1 and 2 will reveal that with the coupling according to the present invention angular displacements between the two collars 1 and 1', even of considerable size, are possible (over 10°). If for instance collar 1 is tilted so that the axis of support axle 2 in FIG. 2 is moved to a position above the viewing plane of FIG. 2 and the axis of support axle 3 below the viewing plane, then as a result of this, torque lever 6, 7, 10 and 11 are moved somewhat inward, which results in an opposing rotation of the coupling rods 12, 13.

Figure 3:
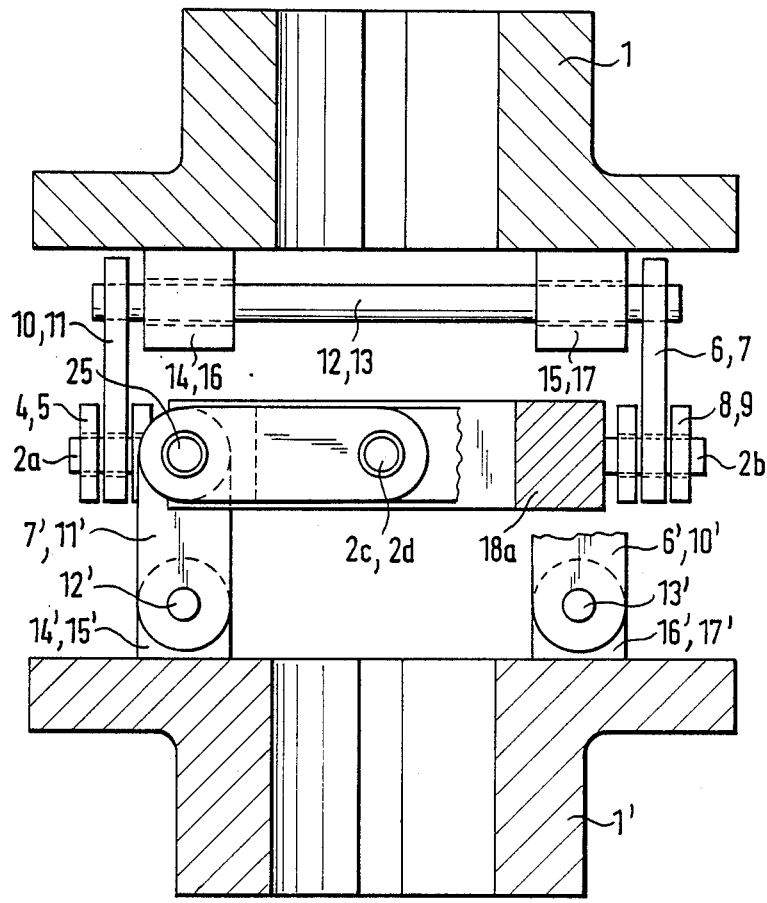
FIG. 3 is a central sectional view through a second embodiment of the present invention.
Figure 4:
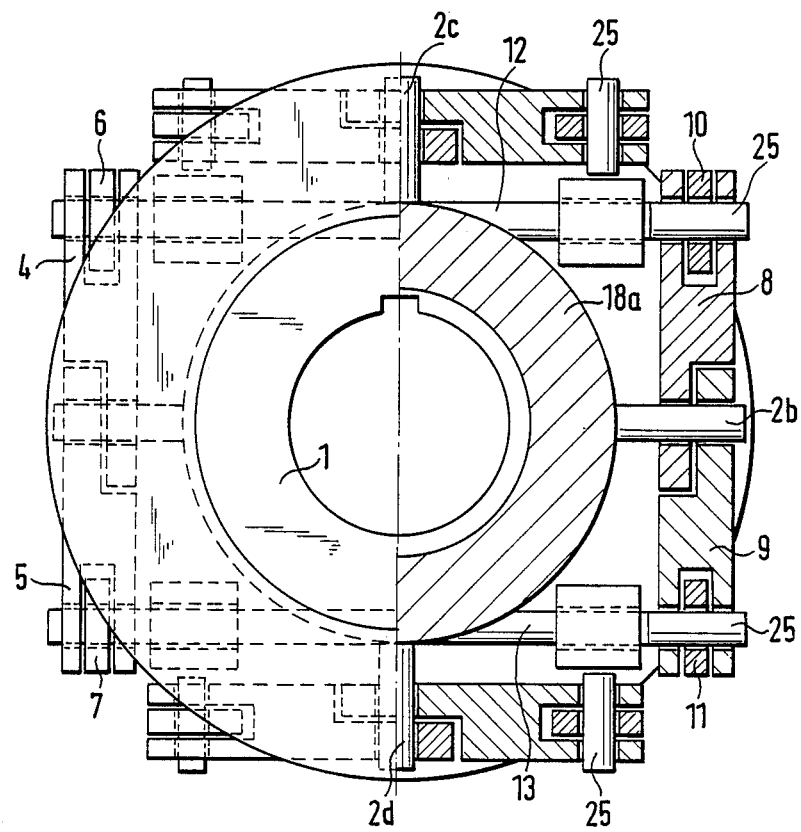
FIG. 4 is a composite view of FIG. 3, the left hand portion being a plan view thereof and the right hand portion being a central horizontal sectional view thereof.

FIGS. 3 and 4 illustrate another embodiment of the present invention. In this embodiment, the same structural components which cooperate with one another are referred to by the same reference numerals as used in FIGS. 1 and 2.

In FIGS. 3 and 4 the coupling rods 12 and 13 are mounted rotatably in bearings, (for example 14a, 15a) of the two collars 1 and 1'.

The coupling arms, (for example 4, 5) associated with the different coupling rods (for example 12, 13) of the same pair of coupling rods are in this embodiment connected over support axles 2a or respectively 2b, 2c, 2d, which are mounted tightly on the outside of the intermediate member 18a, which is annular in this case, or respectively are configured as an integral piece with this intermediate member 18a.

As in the embodiment of FIGS. 1 and 2, the torque levers 6, 7, 10 and 11 are connected non-rotatably with the ends of the coupling rods 12, 13.

The articulation connection joints between the coupling arms 4, 5, 8, 9 and the torque lever 6, 7, 10 and 11 occurs, as in the embodiment of FIGS. 1 and 2, over joint pins or flexible stay bolts 25.

In the embodiment of FIGS. 3 and 4, the intermediate member 18a, which is configured as a ring, is connected to pairs of coupling arms, for example 4, 5, at four peripheral points which are offset from each other by 90° over the above mentioned support axles 2a, 2b, 2c and 2d.

The operation of the embodiment of FIGS. 3 and 4 corresponds to the operation of the embodiment of FIGS. 1 and 2 which has already been described.

Although the invention has been described with respect to a preferred embodiment, it will be apparent that the invention is capable of numerous modifications and variations, apparent to those skilled in the art, without departing from the spirit and scope of the invention, as defined in the claims.

I claim:

1. A flexible coupling for transmitting a driving force from one shaft to another, comprising:
    a pair of generally axially aligned collars, each adapted to receive a shaft,
    a pair of generally parallel coupling rods associated with each collar and arranged off center relative to the axis of its respective collar and arranged symmetrically relative to the axis of its respective collar, and free to rotate about its axis,
    an intermediate member extending generally transversely to the generally aligned collar axes between the two collars,
    the two pairs of coupling rods lying in generally parallel planes on opposite sides of the intermediate member, the rods of one pair being offset 90° relative to the rods of the other pair,
    each pair of coupling rods having associated therewith, on the same side of the intermediate member, two pairs of coupling arms, both pairs of coupling arms extending generally parallel to each other and lying in a plane generally parallel to the plane of their respective coupling rods, the coupling arms of each pair generally aligned with each other and articulated where they meet, for rotational movement relative to each other, and the two coupling arms being generally perpendicular to their respective coupling rods,
    torque levers interconnecting the ends of each coupling rod to the ends of two opposite coupling arms, the torque levers being non-rotationally fixed to their respective coupling rods, and rotatably articulated to their respective coupling arms,
    and wherein on each side of the intermediate member, one of said coupling rods and coupling arms are connected to its respective collar while the other of said coupling rods and coupling arms are connected to the intermediate member.

2. A flexible coupling according to claim 1, wherein the coupling rods are mounted on the intermediate member, each said collar having support axles extending outwardly therefrom parallel to the coupling rods, and the coupling arms of each pair being articulated to each other on a support axle and fixedly connected at their ends to said torque levers.

3. A flexible coupling according to claim 2, wherein the intermediate member is a generally rectangular plate including four bearing members on each side thereof, the coupling rods being rotationally mounted, each in two of said bearing members.

4. A flexible coupling according to claim 1, wherein the coupling rods are mounted rotatably on their respective collars, and wherein the two coupling arms of each pair are articulated to each other on a support axle which extends outwardly from said intermediate member.

5. A flexible coupling according to claim 4, wherein the intermediate member is configured as a circular member with four support axles extending outwardly therefrom, spaced 90° apart, two of the support axles being parallel to two of the coupling rods and the other two support axles being parallel to the other two coupling rods, and the two coupling arms of each pair thereof being articulated to each other on one of said support axles and being connected at their opposite ends to said torque levers.

6. A flexible coupling according to claim 1, wherein the coupling rods are configured as torsion spring rods.

* * * * *